United States Patent
Kakish et al.

(10) Patent No.: US 9,116,679 B2
(45) Date of Patent: Aug. 25, 2015

(54) STORAGE DEVICE POWERED BY A COMMUNICATIONS INTERFACE

(71) Applicant: Western Digital Technologies, Inc., Irvine, CA (US)

(72) Inventors: Musa I. Kakish, Anaheim, CA (US); Charles A. Neumann, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 343 days.

(21) Appl. No.: 13/830,095

(22) Filed: Mar. 14, 2013

(65) Prior Publication Data

US 2014/0281218 A1  Sep. 18, 2014

(51) Int. Cl.
*G06F 1/26* (2006.01)
*G06F 3/06* (2006.01)

(52) U.S. Cl.
CPC .............. *G06F 1/266* (2013.01); *G06F 3/0683* (2013.01); *G06F 3/0689* (2013.01)

(58) Field of Classification Search
CPC ..... G06F 1/266; G06F 3/0683; G06F 3/0689; G06F 2211/1071; G06F 2211/1076; G06F 13/4081; H02J 13/0062
See application file for complete search history.

(56) References Cited

U.S. PATENT DOCUMENTS

| | | | |
|---|---|---|---|
| 7,370,220 B1 * | 5/2008 | Nguyen et al. ................ 713/330 |
| 7,701,705 B1 | 4/2010 | Szeremeta | |
| 8,064,194 B2 | 11/2011 | Szeremeta | |
| 8,113,873 B1 | 2/2012 | Sarraf | |
| 8,133,426 B1 | 3/2012 | Yurchenco et al. | |
| 8,312,302 B2 | 11/2012 | Baker et al. | |
| 8,358,395 B1 | 1/2013 | Szeremeta | |
| 8,417,979 B2 | 4/2013 | Maroney | |
| 8,462,460 B1 | 6/2013 | Szeremeta et al. | |
| 8,498,088 B1 | 7/2013 | Klein | |
| 8,547,658 B1 | 10/2013 | Szeremeta | |
| 2008/0100143 A1 | 5/2008 | Lipcsei | |
| 2009/0108677 A1 | 4/2009 | Walter et al. | |
| 2010/0241799 A1 | 9/2010 | Schuette | |
| 2011/0072290 A1 | 3/2011 | Davis et al. | |
| 2011/0167178 A1 * | 7/2011 | Mogilnitsky et al. ........... 710/19 |
| 2011/0208980 A1 | 8/2011 | Brooks et al. | |
| 2012/0089776 A1 | 4/2012 | Grossman et al. | |
| 2013/0047030 A1 | 2/2013 | Soeda et al. | |
| 2014/0108829 A1 * | 4/2014 | Tai ............................... 713/300 |

OTHER PUBLICATIONS

Notification of the International Search Report and the Written Opinion of the International Search Authority dated Jul. 7, 2014 for related PCT Application No. PCT/US2014/029707, 10 pages.

* cited by examiner

*Primary Examiner* — Dennis M Butler

(57) ABSTRACT

A storage device including a communications interface configured to receive data and power, a plurality of disk drives configured to be powered only by the power received by the communications interface, a controller configured to configure the plurality of disk drives as a redundant array of independent disks, a power regulator configured to transmit the received power from the communications interface to the plurality of disk drives, and a peak current reduction circuit configured to reduce peak current usage by the plurality of disk drives.

21 Claims, 5 Drawing Sheets

STORAGE DEVICE POWERED BY A COMMUNICATIONS INTERFACE

BACKGROUND

A conventional redundant array of independent disks ("RAID") device is used to provide redundant storage for sensitive data. In some situations, the conventional RAID device can also increase data storage performance. However, the conventional RAID device generally comprises multiple disk drives which in aggregate utilizes a large amount of peak power. Due to the large amount of peak power used by the disk drives within the conventional RAID device, the conventional RAID device is powered by a wall outlet, or in some instances, a battery backup. However, this may limit the use of the conventional RAID device since the conventional RAID device has limited portability and can only be operated in limited locations For example, the conventional RAID device may only be able to be used with the laptop when a wall outlet or a battery backup is available for the conventional RAID device. When the laptop is not near a wall outlet or a battery backup, the conventional RAID device may not be able to be used. Even when the laptop is near a wall outlet or a battery backup, the wall outlet or a battery backup may only have a single connection available. This means that only the laptop and not both the laptop and the conventional RAID device, may be powered by the wall outlet or the battery backup.

Furthermore, even when a connection is available in the wall outlet or the battery backup, the power cable from the conventional RAID device to the wall outlet or the battery backup may hinder operation of the laptop or make it cumbersome to operate the conventional RAID device. For example, the power cable may overlap the laptop. Thus, even when the conventional RAID device may be powered by the wall outlet or the battery backup, a user of the laptop may choose to operate the conventional RAID device in only limited circumstances.

BRIEF DESCRIPTION OF THE DRAWINGS

The features and advantages of the present embodiments will become more apparent from the detailed description set forth below when taken in conjunction with the drawings, wherein.

DETAILED DESCRIPTION

Figure 1:
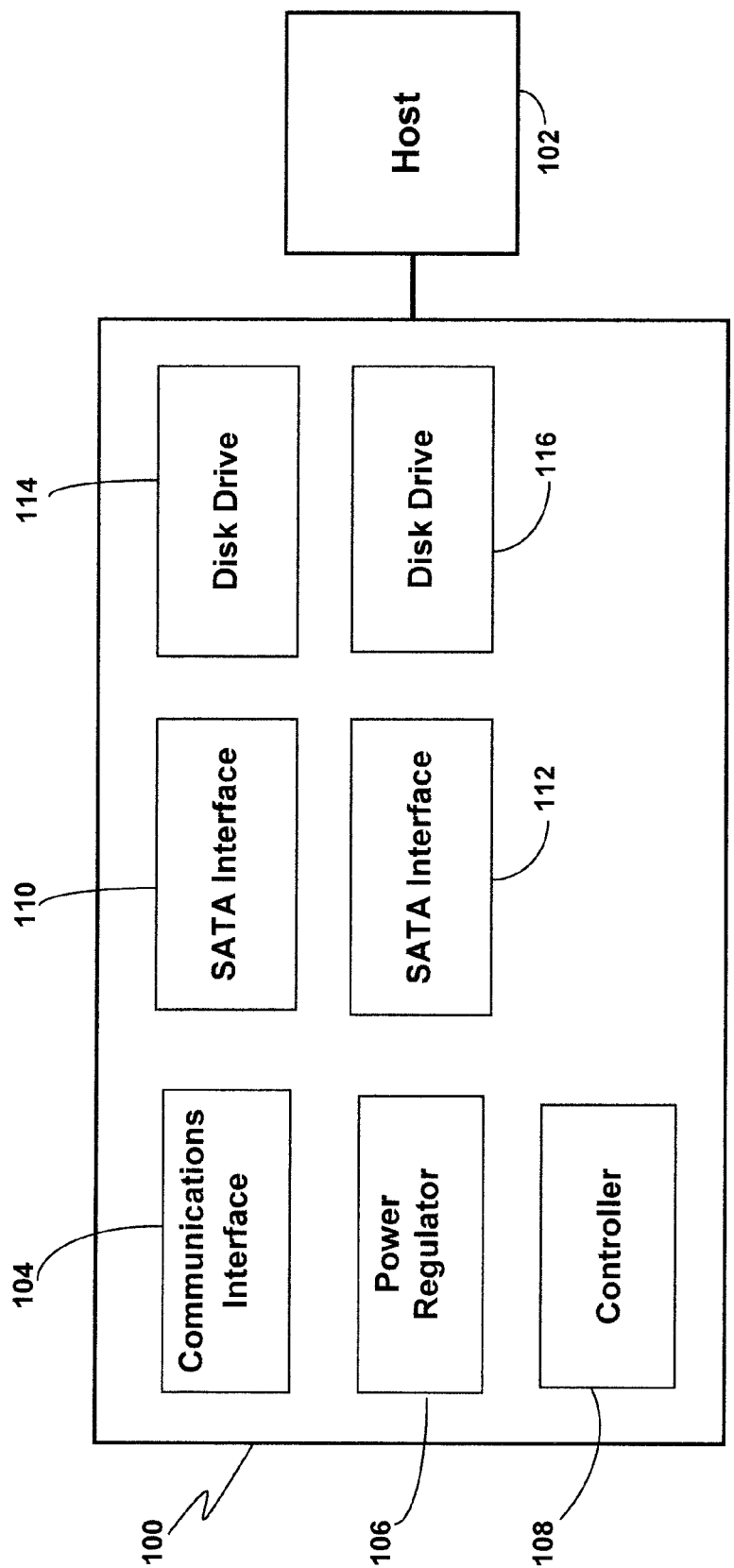
FIG. 1 is a box diagram of a storage device connected to a host according to an embodiment.

In an embodiment as seen in FIG. 1, a storage device 100 is shown. In an embodiment, the storage device 100 comprises a bus-powered storage device. In an embodiment, the storage device 100 comprises a bus-powered redundant array of independent disks ("RAID") device. In an embodiment the storage device 100 is configured to be connected to a host 102. In an embodiment, the storage device 100 only receives power from the host 102. In an embodiment, the host 102 comprises a computer, a laptop, or a tablet. As can be seen in the embodiment shown in FIG. 1, the storage device 100 comprises a communications interface 104, a power regulator 106, a controller 108, a serial advanced technology attachment ("SATA") interface 110, a SATA interface 112, a disk drive 114, and a disk drive 116. In an embodiment, the storage device 100 excludes a circuit configured to receive power directly from a wall outlet or a backup battery.

In an embodiment, the controller 108 is configured to configure the disk drives 114 and 116 as a RAID. In an embodiment, the controller 108 is configured to configure the disk drives 114 as a RAID 0. In an embodiment, the controller 108 is configured to configure the disk drives 114 as other types of RAID aside from RAID 0. In an embodiment, at least one of the disk drives 114 or 116 comprises a magnetic rotating disk. In an embodiment, each of the disk drives 114 and 116 comprises a magnetic rotating disk. In an embodiment, at least one of the disk drives 114 or 116 comprises a solid state memory in addition to the magnetic rotating disk. In an embodiment, each of the disk drives 114 and 116 comprises a solid state memory in addition to the magnetic rotating disk.

While the description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

In an embodiment, the storage device 100 is configured to connect to the host 102 using the communications interface 104. In an embodiment, the communications interface 104 connects to the host 102 using a cable. In an embodiment, the communications interface 104 is configured to receive data and power from the host 102.

In an embodiment, the communications interface 104 is configured to transmit data between the host 102 and the disk drives 114 and 116 a selected data transfer rate. In an embodiment, the selected data transfer rate comprises at least 3 Gigabits per second. For example, the communications interface can be configured to receive data from the host 102 at a rate of at least 3 Gigabits per second. Likewise, the communications interface 104 can be configured to transmit data from the disk drives 114 and 116 to the host 102 at a rate of at least 3 Gigabits per second.

In an embodiment, the selected data transfer rate comprises approximately 10 Gigabits per second. For example, the communications interface 104 can be configured to transmit data between the host 102 and the disk drives 114 and 116 at a rate of approximately 10 Gigabits per second. In an embodiment, the selected data transfer rate comprises at least 10 Gigabits per second. For example, the communications interface 104 can be configured to transmit data between the host 102 and the disk drives 114 and 116 at a rate of at least 10 Gigabits per second. In an embodiment, the selected data transfer rate comprises approximately 20 Gigabits per second. For example, the communications interface 104 can be configured to transmit data between the host 102 and the disk drives 114 and 116 at a rate of approximately 20 Gigabits per second. In an embodiment, the selected data transfer rate comprises at least 20 Gigabits per second. For example, the communications interface 104 can be configured to transmit data between the host 102 and the disk drives 114 and 116 at a rate of at least 20 Gigabits per second.

In an embodiment, the communications interface 104 is configured to transmit data between the host 102 and the disk drives 114 and 116. For example, the communications interface is configured to transmit data from the host 102 to the disk drives 114 and 116 using the SATA interfaces 110 and 112, respectively. Similarly, in an embodiment, the communications interface 104 is configured to transmit data from the disk drives 114 and 116 to the host 102 using the SATA interfaces 110 and 112, respectively.

In an embodiment, the communications interface 104 is configured to receive at least 9.5 watts of power from the host 102. In an embodiment, the communications interface 104 is configured to receive at least 9.5 watts of peak power from the host 102. However, in an embodiment, the communications interface 104 is configured to receive at most a peak power not greater than a maximum peak power threshold. In an embodiment the maximum peak power threshold comprises 10 watts. In an embodiment, the communications interface 104 is configured to receive at least a predetermined minimum power threshold from the host 102. In an embodiment, the predetermined minimum power threshold need not be 9.5 watts, but can be, for example, a power less than 9.5 watts. Similarly, in an embodiment, the maximum peak power threshold can be greater than 10 watts. In an embodiment, the communications interface 104 is configured to receive less than 9.5 watts of power or greater than 10 watts of power from the host 102.

In an embodiment, the power received by communications interface 104 is used to power the disk drives 114 and 116. The communications interface 104 can also, for example, power the other components in the storage device 100 such as the controller 108, and the SATA interfaces 110 and 112. Furthermore, if necessary, the communications interface 104 can also be used to power a portion of the cable connecting the communications interface 104 and the host 102.

In an embodiment, the disk drives 114 and 116 are configured to be powered only by the power received by the communications interface 104. In an embodiment, the power regulator 106 is electrically connected to the communications interface 104 and the disk drives 114 and 116. The power regulator 106 is configured to transmit the received power from the communications interface 104 to the disk drives 114 and 116 in order to power the disk drives 114 and 116.

In an embodiment, the communications interface 104 receives power from the host 102 comprising a voltage $V_1$. In an embodiment, the voltage $V_1$ comprises 12 volts. In an embodiment, the voltage $V_1$ comprises 15 volts. In an embodiment, the voltage $V_1$ comprises sufficient voltage to power the disk drives 114 and 116.

The power regulator 106 is configured to convert the voltage $V_1$ to a voltage $V_2$ and supply the voltage $V_2$ to the disk drives 114 and 116. In an embodiment, the voltage $V_2$ comprises voltage utilized by the disk drives 114 and 116. In an embodiment, the disk drives 114 and 116 utilize a reduced amount of voltage, such as 4.7 volts.

In an embodiment, the reduced amount of voltage used by the disk drives 114 and 116 improves the ability of the disk drives 114 and 116 to be powered despite the limited amount of power received by the communications interface 104. For example, the reduced voltage used by the disk drives 114 and 116 can reduce peak power used by the disk drives 114 and 116. Since the communications interface 104 may receive peak power which is constrained by the predetermined maximum peak power threshold, the disk drives 114 and 116 are less likely to require the communications interface 104 to receive peak power greater than the predetermined maximum peak power threshold.

In an embodiment, the voltage $V_2$ is set such that the disk drives 114 and 116 are configured to be fully operational when the communications interface 104 receives peak power no greater than the predetermined maximum peak power threshold. In an embodiment, the disk drives 114 and 116 are configured to be fully operational when the disk drives 114 and 116 are configured to receive or transmit data at the selected data transfer rate of the communications interface 104. In an embodiment, the disk drives 114 and 116 are configured to be fully operational when the disk drives 114 and 116 are configured to read and write data at the selected data transfer rate of the communications interface 104.

Figure 2:
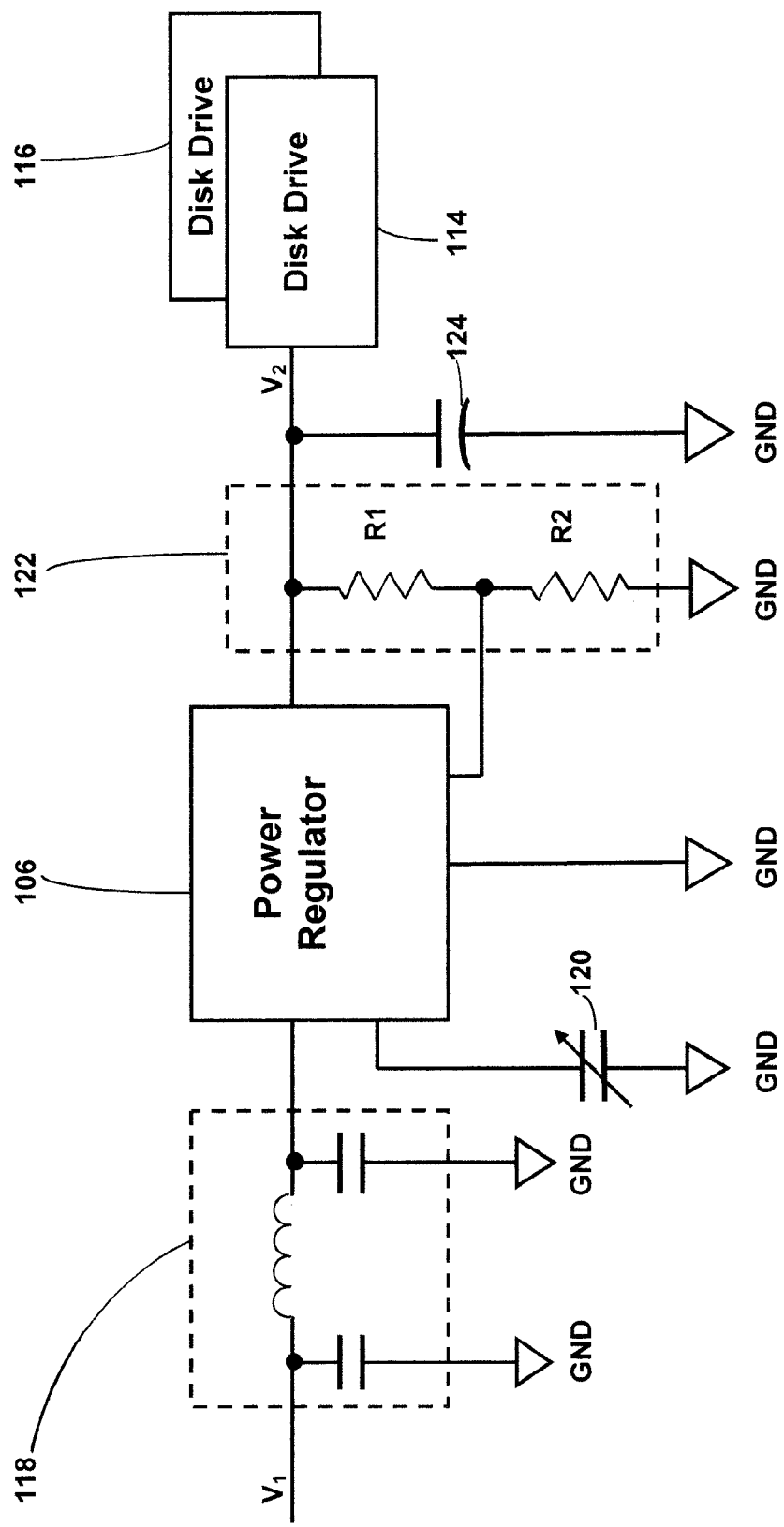
FIG. 2 is a portion of the storage device including a power regulator and disk drives according to an embodiment.

In an embodiment, as shown in FIG. 2, the storage device 100 comprises a voltage divider circuit 122 connected between the disk drives 114 and 116. The voltage divider circuit 122 can aid in ensuring that the voltage $V_2$ is supplied to the disk drives 114 and 116. In an embodiment, the voltage divider circuit 122 can aid in converting the voltage $V_1$ to the voltage $V_2$. The voltage divider circuit 122 can comprise, for example, resistors R1 and R2. The resistance of the resistors R1 and R2 can be adjusted, for example, to aid in ensuring the voltage $V_2$ is supplied to the disk drives 114 and 116, or converting the voltage $V_1$ to the voltage $V_2$.

In an embodiment, the power regulator 106 converts the voltage $V_1$ to the voltage $V_3$ and the voltage divider circuit 122 converts the voltage $V_3$ to the voltage $V_2$. In an embodiment, the voltage $V_3$ comprises 5 volts. Thus, in an embodiment, the power regulator 106 converts 12 volts to 5 volts and converts 5 volts to 4.7 volts with the aid of the voltage divider circuit 122. The 4.7 volts can then be supplied to the disk drives 114 and 116.

In an embodiment, the voltage divider circuit 122 forms a feedback loop with the power regulator 106. In an embodiment, the voltage divider circuit 122 is part of the power regulator 106.

Figure 3:
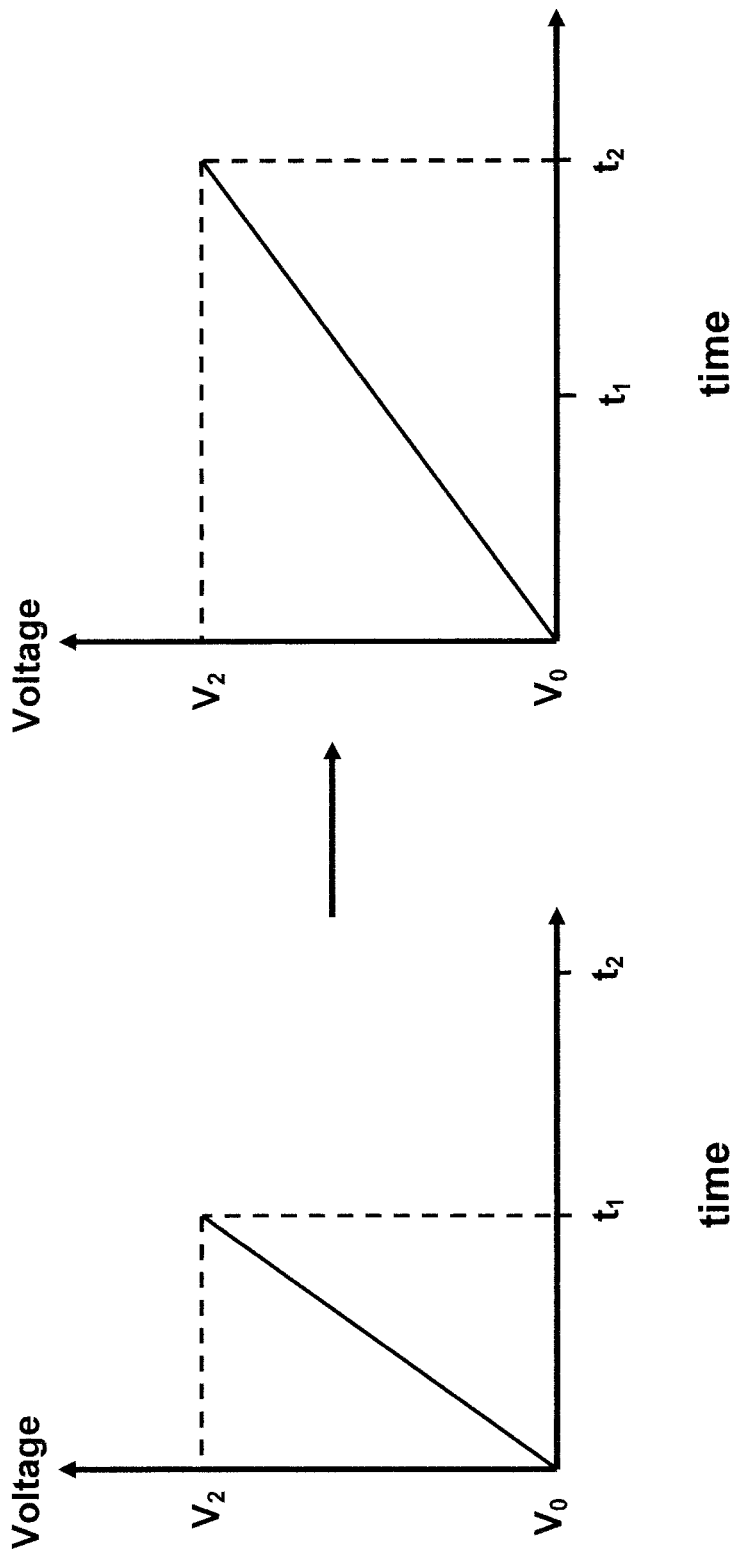
FIG. 3 depicts voltage graphs according to an embodiment.

In an embodiment, the power regulator 106 can also adjust a time required to convert the voltage $V_1$ to the voltage $V_2$ using a variable capacitor 120 (FIG. 2) as seen in voltage graphs in an embodiment in FIG. 3. For example, as seen in a voltage graph in an embodiment in FIG. 3, the power regulator 106 converts the voltage $V_0$ to $V_2$ at a time t1. However, as seen in another voltage graph in the embodiment in FIG. 3, the power regulator 106 adjusts the time required to convert the voltage $V_0$ to $V_2$ from the time t1 to a time t2. In an embodiment, the power regulator 106 adjusts the time to convert the voltage by adjusting a capacitance of the variable capacitor 120. In an embodiment, the voltage $V_0$ is the voltage $V_1$.

In an embodiment, the storage device 100 comprises a peak current reduction circuit configured to reduce peak current usage by the disk drives 114 and 116. In an embodiment, the peak current reduction circuit comprises a LC filter 118, a super capacitor 124, or any combination thereof. In an embodiment, the peak current reduction circuit comprises additional electrical components which reduce a peak current of the disk drives 114 and 116.

In an embodiment, as seen in FIG. 2, the LC filter comprises one or more capacitors and one or more inductors. The LC filter can comprise, for example, two capacitors and an inductor. However, additional numbers of capacitors or inductors may be used to form the LC filter 118. By reducing the peak current use by the disk drives 114 and 116, the peak power used by the disk drives 114 and 116 can be reduced.

In an embodiment, the LC filter is configured to reduce peak current use of the disk drives 114 and 116 such that the disk drives 114 and 116 are configured to be fully operational when the communications interface 104 receives peak power no greater than the predetermined maximum peak power threshold.

In an embodiment, the super capacitor 124 has a capacitance of 3000 μF. In an embodiment, the super capacitor 124 comprises two or more super capacitors. For example, the super capacitor 124 can comprise two super capacitors, with each of the super capacitors having a capacitance of 1500 μF. In an embodiment, the super capacitor comprises a capacitance sufficient to reduce peak current use of the disk drives 114 and 116 such that the disk drives 114 and 116 are configured to be fully operational when the communications interface 104 receives peak power no greater than the predetermined maximum peak power threshold.

In an embodiment, the controller 108 is configured to implement a reduced current spinup mode for the disk drives 114 and 116 to reduce an amount of peak current utilized by the disk drives 114 and 116 during spinup of the disk drives 114 and 116. In an embodiment, reducing the peak current utilized by the disk drives 114 and 116 during spinup of the disk drives 114 and 116 generally lowers the peak power utilized by the disk drives 114 and 116 since a spinup of a disk drive is generally when the disk drive utilizes a greatest amount of peak power.

Figure 4:
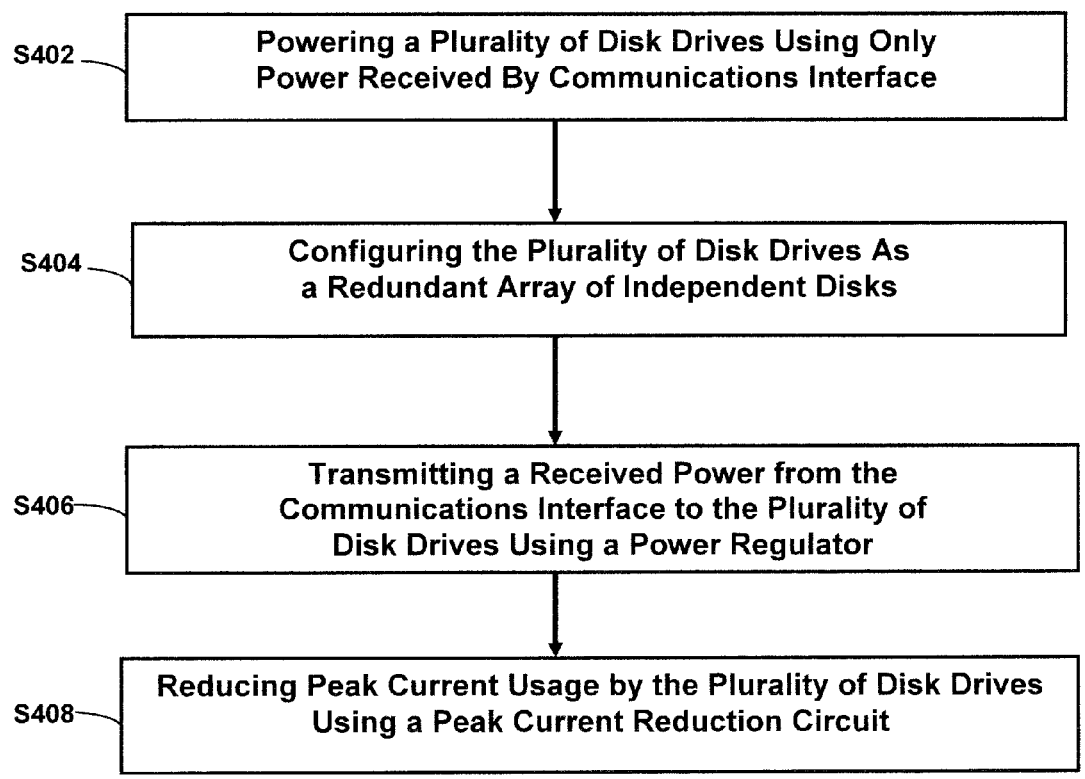
FIG. 4 depicts a process for operating a storage device comprising a plurality of disks and a communications interface according to an embodiment.

In an embodiment, a process for operating a storage device comprising a plurality of disks and a communications interface is disclosed in FIG. 4. In block S402, the disk drives 114 and 116 are powered only by the power received by the communications interface 104. In block S404, the disk drives 114 and 116 are configured as a RAID by the controller 108. In an embodiment, the controller 108 configures the disk drives 114 and 116 as a RAID 0.

In block S406, the received power from the communications interface 104 is transmitted to the disk drives 114 and 116 using the power regulator 106. In block S408, peak current usage by the disk drives 114 and 116 are reduced using a peak current reduction circuit. The peak current reduction circuit can comprise, for example, the LC filter 118, the super capacitor 124, or any combination thereof.

Figure 5:
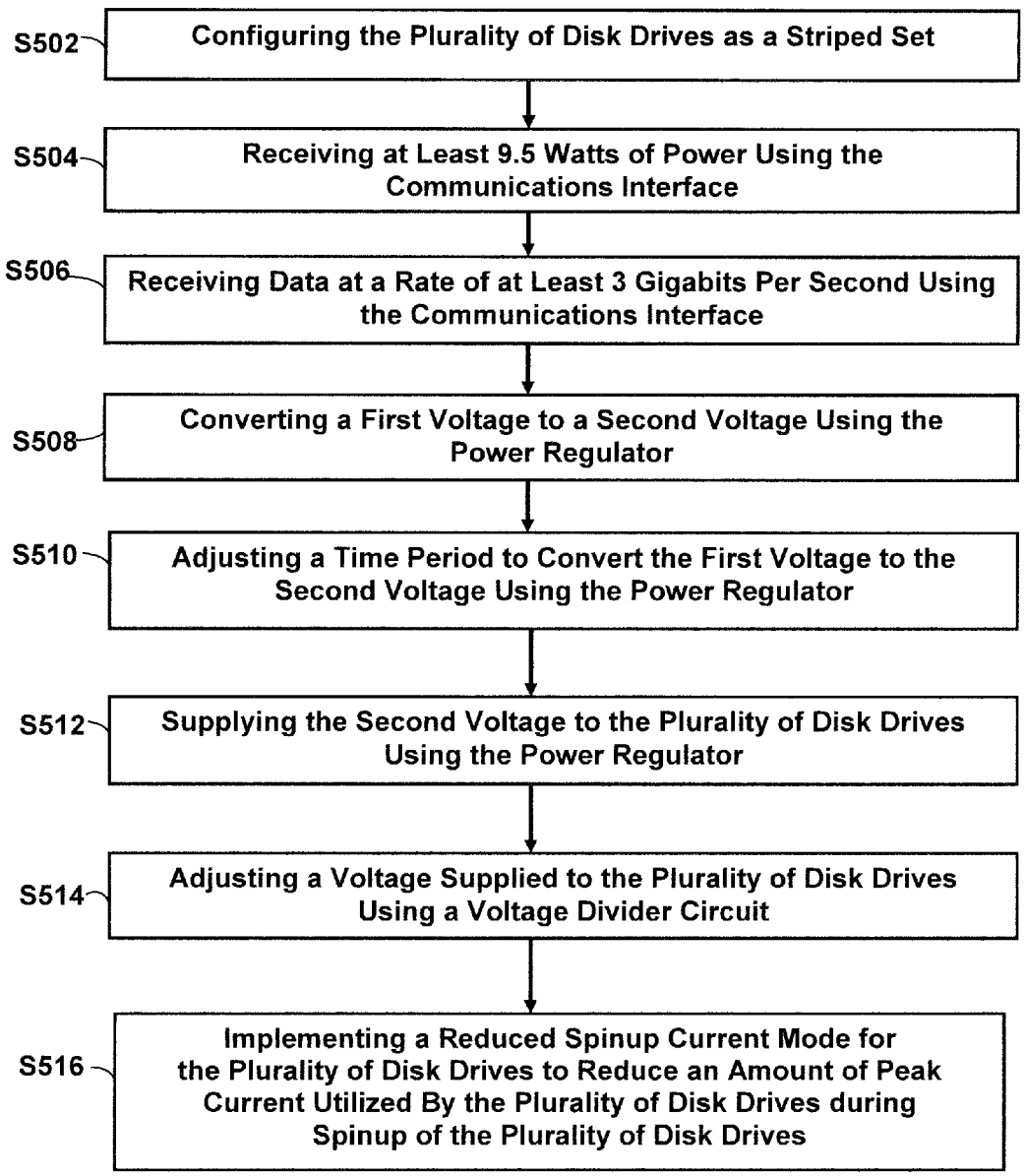
FIG. 5 depicts additional optional blocks for a process for operating a storage device comprising a plurality of disks and a communications interface according to an embodiment.

In an embodiment, additional optional blocks for a process for operating a storage device comprising a plurality of disks and a communications interface is disclosed in FIG. 5. In block S502, the disk drives 114 and 116 are configured as a striped set by the controller 108. In block S504, at least 9.5 watts of power are received by the communications interface 104. In block S506, data is received at a rate of at least 3 Gigabits per second of data using the communications interface 104.

In block S508 the voltage $V_1$ is converted to the voltage $V_2$ using the power regulator 106. In block S510, a time period to convert the voltage $V_1$ to the voltage $V_2$ is adjusted using the power regulator 106. In block S512, the voltage $V_2$ is supplied to the disk drives 114 and 116 using the power regulator 106. In block S514, the voltage supplied to the disk drives 114 and 116 is adjusted using the voltage divider circuit 122. In block S516, a reduced spinup current mode for the disk drives 114 and 116 is implemented by the controller 108 to reduce an amount of peak current utilized by the disk drives 114 and 116.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A storage device comprising:
 a communications interface configured to receive data and power;
 a plurality of disk drives configured to be powered only by the power received by the communications interface;
 a controller configured to configure the plurality of disk drives as a redundant array of independent disks;
 a power regulator configured to transmit the received power from the communications interface to the plurality of disk drives; and
 a peak current reduction circuit configured to reduce peak current usage by the plurality of disk drives.

2. The storage device of claim 1 wherein the peak current reduction circuit comprises at least a LC filter or a super capacitor.

3. The storage device of claim 1 wherein the power received by the communications interface comprises a first voltage and the power regulator is further configured to convert the first voltage to a second voltage and supply the second voltage to the plurality of disk drives.

4. The storage device of claim 3 wherein the power regulator is further configured to adjust a time period to convert the first voltage to the second voltage.

5. The storage device of claim 1 further comprising a voltage divider circuit connected between the power regulator and the plurality of disk drives.

6. The storage device of claim 1 wherein the controller is further configured to implement a reduced spinup current mode for the plurality of disk drives to reduce an amount of peak current utilized by the plurality of disk drives during spinup of the plurality of disk drives.

7. The storage device of claim 1 wherein the plurality of disk drives are configured to utilize approximately 4.7 volts.

8. The storage device of claim 1 wherein the communications interface is configured to receive at least 9.5 watts of power.

9. The storage device of claim 1 wherein the communications interface is configured to receive data at a rate of at least 3 Gigabits per second.

10. The storage device of claim 1 wherein the controller is further configured to configure the plurality of disk drives as a striped set.

11. A method for operating a storage device comprising a plurality of disks and a communications interface configured to receive data and power, the method comprising at least:
   powering the plurality of disk drives using only power received by the communications interface;
   configuring the plurality of disk drives as a redundant array of independent disks;
   transmitting the received power from the communications interface to the plurality of disk drives using a power regulator; and
   reducing peak current usage by the plurality of disk drives using a peak current reduction circuit.

12. The method of claim 11 wherein the peak current reduction circuit comprises at least a LC filter or a super capacitor.

13. The method of claim 11 wherein the power received by the communications interface comprises a first voltage.

14. The method of claim 13 further comprising:
   converting the first voltage to a second voltage using the power regulator; and
   supplying the second voltage to the plurality of disk drives using the power regulator.

15. The method of claim 14 further comprising:
   adjusting a time period to convert the first voltage to the second voltage using the power regulator.

16. The method of claim 11 further comprising adjusting a voltage supplied to the plurality of disk drives using a voltage divider circuit.

17. The method of claim 11 further comprising implementing a reduced spinup current mode for the plurality of disk drives to reduce an amount of peak current utilized by the plurality of disk drives during spinup of the plurality of disk drives.

18. The method of claim 11 wherein the plurality of disk drives are configured to utilize approximately 4.7 volts.

19. The method of claim 11 further comprising receiving at least 9.5 watts of power using the communications interface.

20. The method of claim 11 further comprising receiving data at a rate of at least 3 Gigabits per second using the communications interface.

21. The method of claim 11 wherein the configuring the plurality of disk drives as a redundant array of independent disks further comprises:
   configuring the plurality of disk drives as a striped set.

* * * * *